United States Patent [19]
Askins et al.

[11] Patent Number: 5,943,982
[45] Date of Patent: *Aug. 31, 1999

[54] MODULAR COMBINATION DOG HOME AND EXERCISE PEN

[75] Inventors: William E. Askins; Gary H. Roulston, both of Lititz, Pa.

[73] Assignee: Woodstream Corporation, Lititz, Pa.

[*] Notice: This patent is subject to a terminal disclaimer.

[21] Appl. No.: 09/037,679

[22] Filed: Mar. 10, 1998

Related U.S. Application Data

[63] Continuation of application No. 08/779,952, Dec. 23, 1996, Pat. No. 5,727,502.

[51] Int. Cl.$^6$ .................................................. A01K 1/03
[52] U.S. Cl. .......................................... 119/499; 119/502
[58] Field of Search ..................................... 119/459, 461, 119/467, 482, 499, 502

[56] References Cited

U.S. PATENT DOCUMENTS

| | | | |
|---|---|---|---|
| 45,080 | 11/1864 | Sage et al. | 119/482 |
| 1,330,404 | 1/1920 | Sommer | 119/502 |
| 1,331,117 | 2/1920 | Miller | 119/502 |
| 2,892,562 | 6/1959 | Smithson | 119/461 |
| 4,762,085 | 8/1988 | Ondrasik | 119/17 |
| 4,909,188 | 3/1990 | Tominaga | 119/474 |
| 5,010,848 | 4/1991 | Rankin | 119/26 |
| 5,549,073 | 8/1996 | Askins et al. | 119/474 |

*Primary Examiner*—Michael J. Carone
*Assistant Examiner*—Elizabeth Shaw
*Attorney, Agent, or Firm*—Jacobson, Price, Holman & Stern, PLLC

[57] ABSTRACT

A collapsible pet home having a base, side walls, end walls and a roof can be converted into an exercise pen for the pet by folding the end walls down onto the base, setting the base on end and using the base, side walls and roof to form peripheral walls of the exercise pen. An additional pen-forming module is provided to connect with the roof one side and one of the side walls on the other side to complete the peripheral wall of the exercise pen. The base may have a compartment for storing the additional module when it is not in use. The entire structure folds down into a compact package.

10 Claims, 9 Drawing Sheets

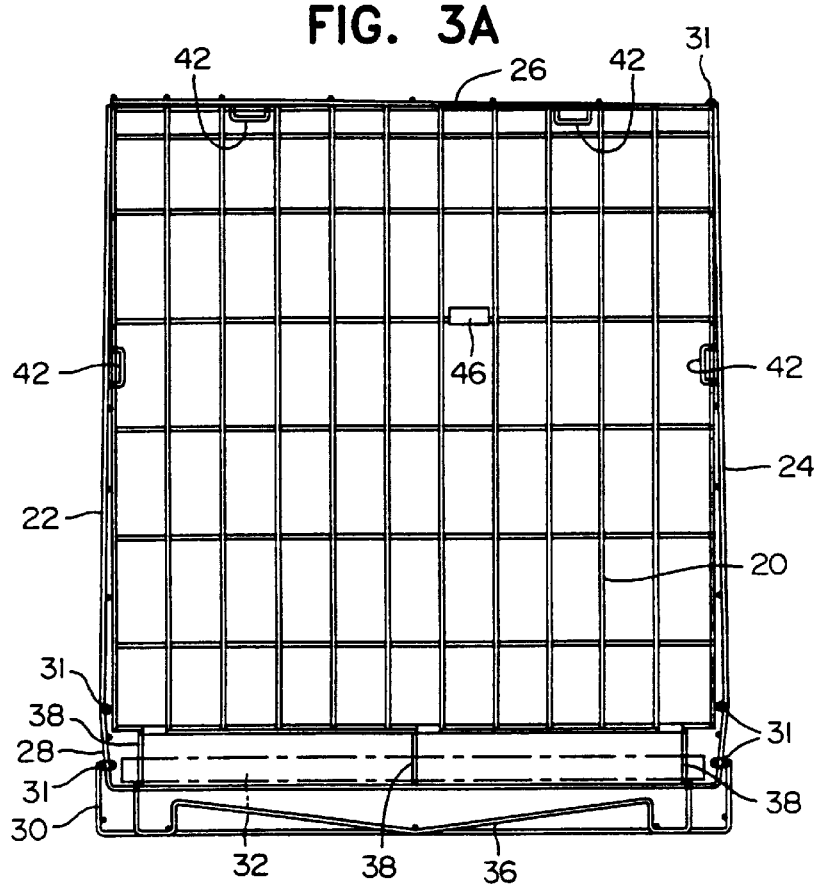
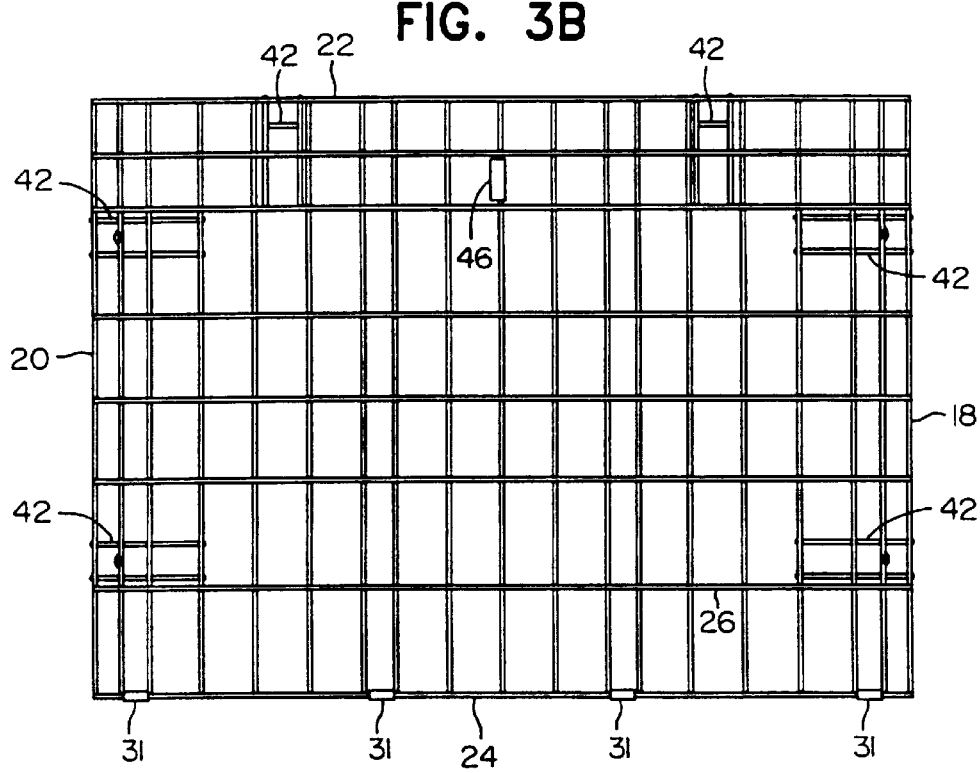

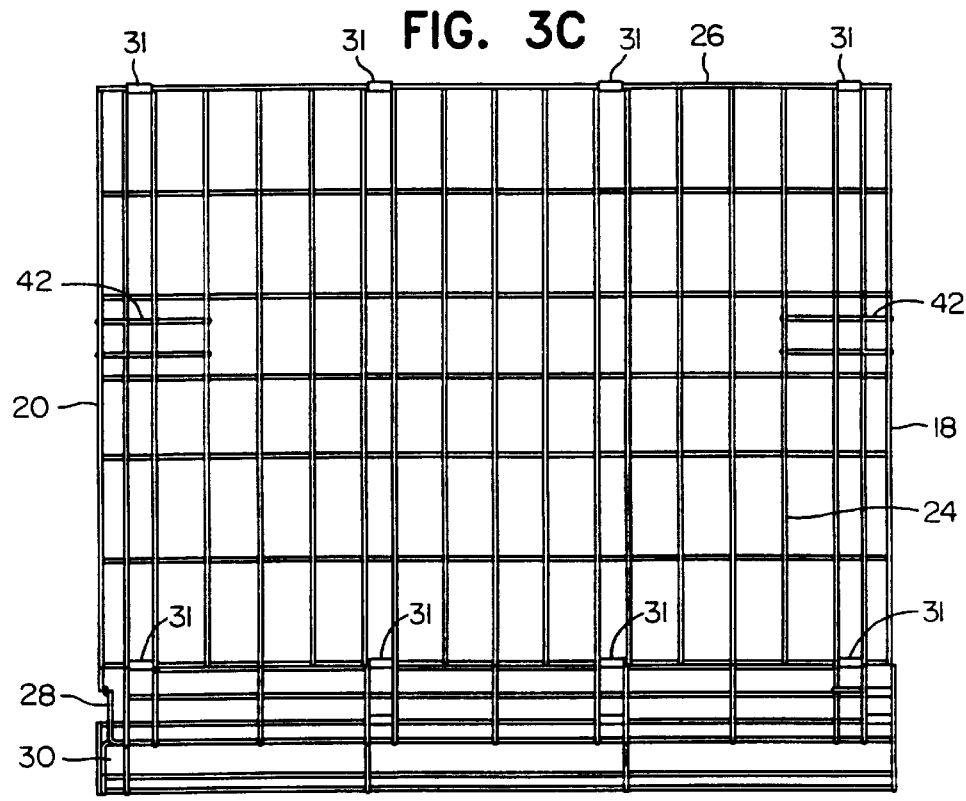
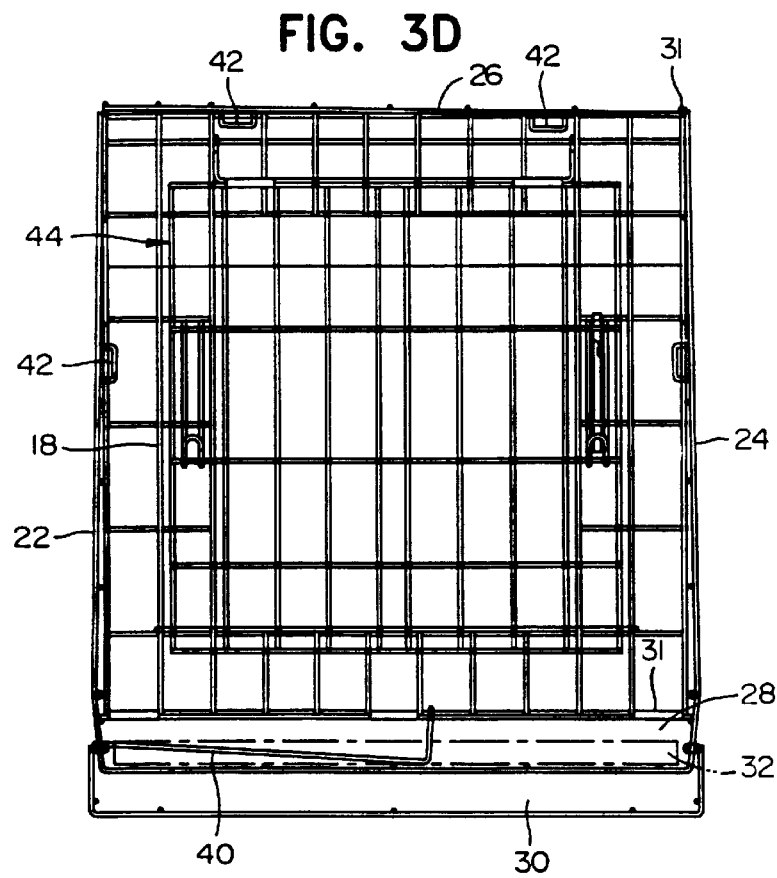

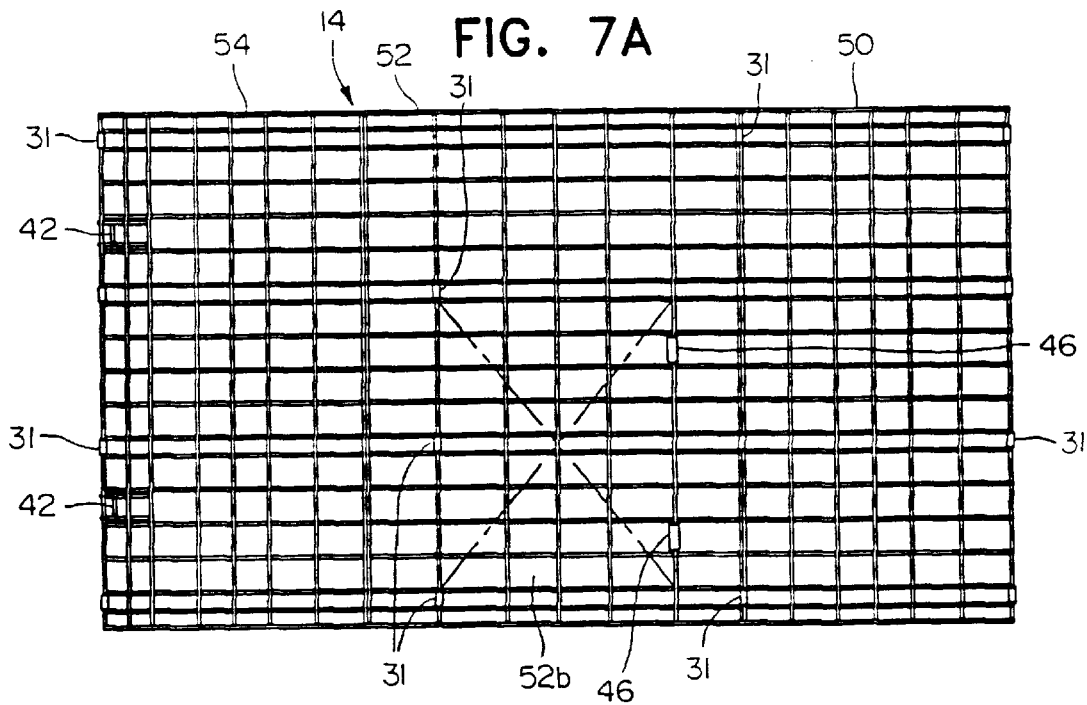
FIG. 7A
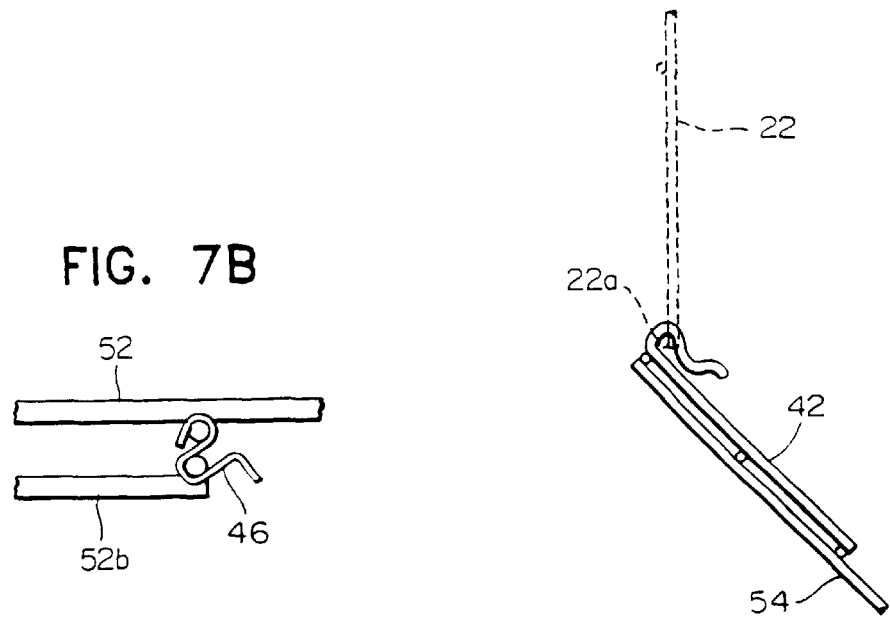
FIG. 7B
FIG. 7C

MODULAR COMBINATION DOG HOME AND EXERCISE PEN

This is a continuation of application Ser. No. 08/779,952 filed Dec. 23, 1996, now U.S. Pat. No. 5,727,502.

BACKGROUND OF THE INVENTION

This invention relates to a convertible structure which can be assembled for use either as a pet home or as an exercise pen for the pet and which can be readily converted between the two uses. The invention is intended primarily for use as a dog home and exercise pen but can also be used for other animals such as rabbits.

Separate dog homes and exercise pens are currently available and if pet owners desire each item, they must make two separate purchases. This is a large outlay, since each item can be somewhat expensive. The current practice is also inconvenient in its use of storage space, since typically only one item is in use at any time, and is wasteful of materials in that similar wall panels may be used in each product, but are not utilized together.

SUMMARY OF THE INVENTION

It is an object of the invention to provide a combination structure which can be assembled either as a pet home or as an exercise pen, which can be readily converted between the two uses and which can be knocked down, when not in use to form a compact readily transportable and storable package.

It is another object of the invention to provide a combination structure as above which is converted from a home to an exercise pen by the addition of a wall module assembly. A further object of the invention is to provide the combination with the facility for adding further wall module assemblies, as required, to increase the size of the exercise pen.

Another object of the invention is to provide a combination structure, as above, which is more economical to manufacture and purchase than a separate pet home and exercise pen of comparable scale.

Still another object of the invention is to provide a combination pet home and exercise pen in which maximum use is made of the wall panels of the pet home when converting the structure into an exercise pen.

Yet another object of the invention is to provide a combination pet home and exercise pen which is simple to set up, take down and convert from one use to the other.

Generally stated, the invention provides a combination pet home/exercise pen structure comprising a plurality of interconnected hinged panels, preferably wire mesh panels, which fold into a compact package with the panels overlaid one on another, which can be erected into a pet home having a base, side walls, end walls and a flat roof, by unfolding the panels and clipping adjacent panel edges together, and which can be converted from a pet home to an exercise pen by unclipping the panels, setting the pet home on one end, folding the end walls in against the base, opening out the side walls and roof and clipping one or more additional wall module assemblies (each comprising two or more hinged wall panels of similar configuration to the side wall panels) to free outer edges of the one side wall and the roof respectively to form a pen enclosure.

In a preferred form of the invention, the base of the structure may comprise upper and lower walls defining a compartment therebetween forming a storage receptacle for the additional pen-forming wall module assembly with its respective panels folded together one against another. The base may also include a second compartment for a slide-out tray for pet droppings, etc.

Conveniently, hooks may be provided at the edges of selected walls of the structure for hooking onto end rods of adjacent walls to clip the walls together when the structure is erected and which can readily be unhooked when the structure is to be folded. The configuration of the clips, the side walls, the end walls and the roof, may be such that in the erected position of the pet home, the roof can be unhooked from the side walls and end walls and hinged open, like the lid of a box, without affecting the integrity of the side walls and end walls. Other forms of clipping means can also be used however.

A first pet access door may be provided in one of the end walls and a second pet access door may be provided in one of the panels of the additional wall module assembly. The pet home portion of the structure can be sold separately (without the additional wall module assembly) for users who do not require the exercise pen facility and likewise, additional wall module assemblies can also be sold separately as add-ons. The size of the exercise pen can be increased by further add-on assemblies, as required.

Additional features and advantages of the invention will become apparent from the ensuing description and claims read in conjunction with the attached drawings.

BRIEF DESCRIPTION OF THE DRAWINGS

FIG. 3A is a rear end view of the erected dog home;

FIG. 3B is a plan view of the dog home;

FIG. 3C is a side view of the dog home;

FIG. 3D is a front end view of the dog home;

FIG. 7A is a side view of the additional wall module assembly;

FIG. 7B is an enlarged part-sectional plan view of a part of FIG. 7A;

FIG. 7C is an enlarged plan view of another part of FIG. 7A; and

DESCRIPTION OF PREFERRED EMBODIMENTS

Figure 1:
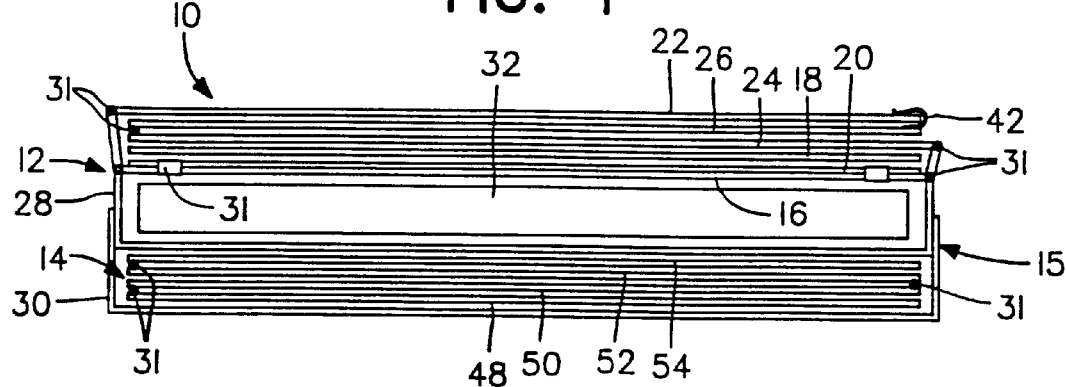
FIG. 1 is a diagrammatic end view of a convertible structure according to the invention, in a folded configuration for storage and transport.
Figure 3:
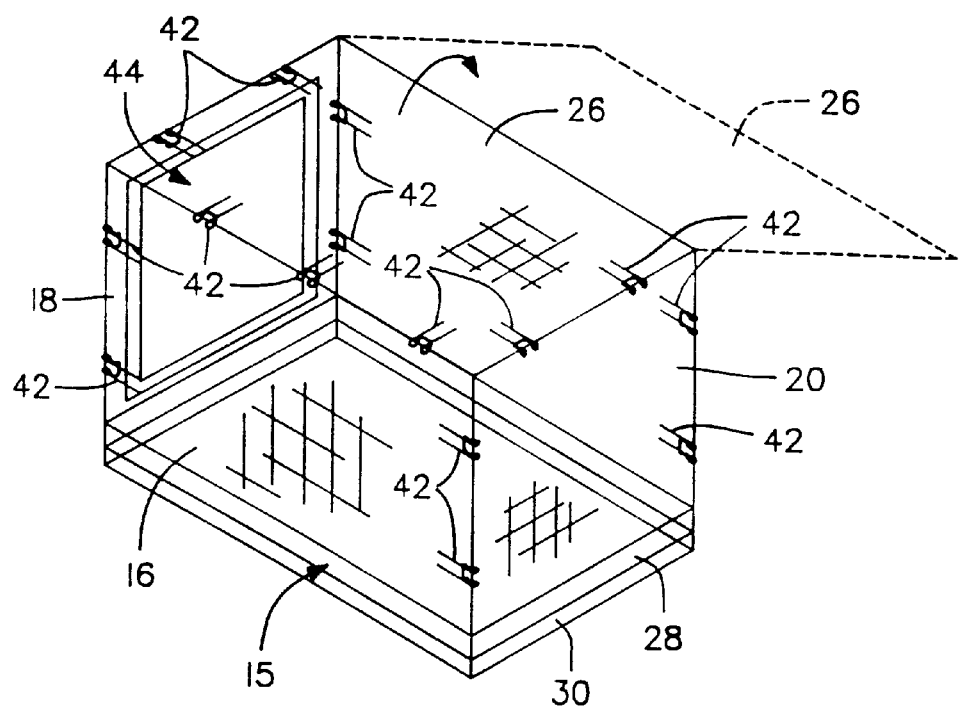
FIG. 3 is a diagrammatic perspective view of the structure when erected as a dog home.
Figure 3E:
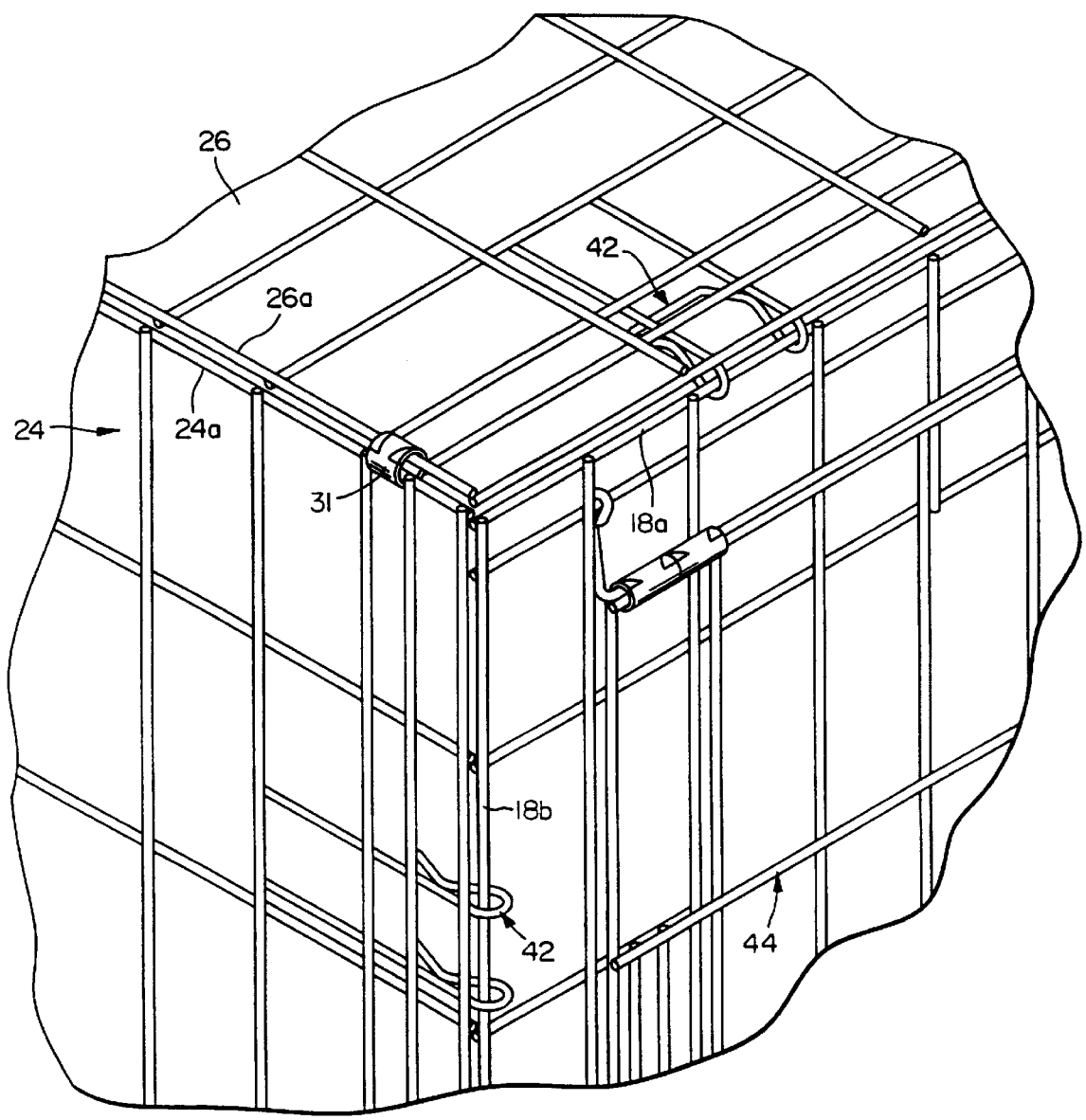
FIG. 3E is an enlarged perspective view of one top corner of the dog home.
Figure 6:
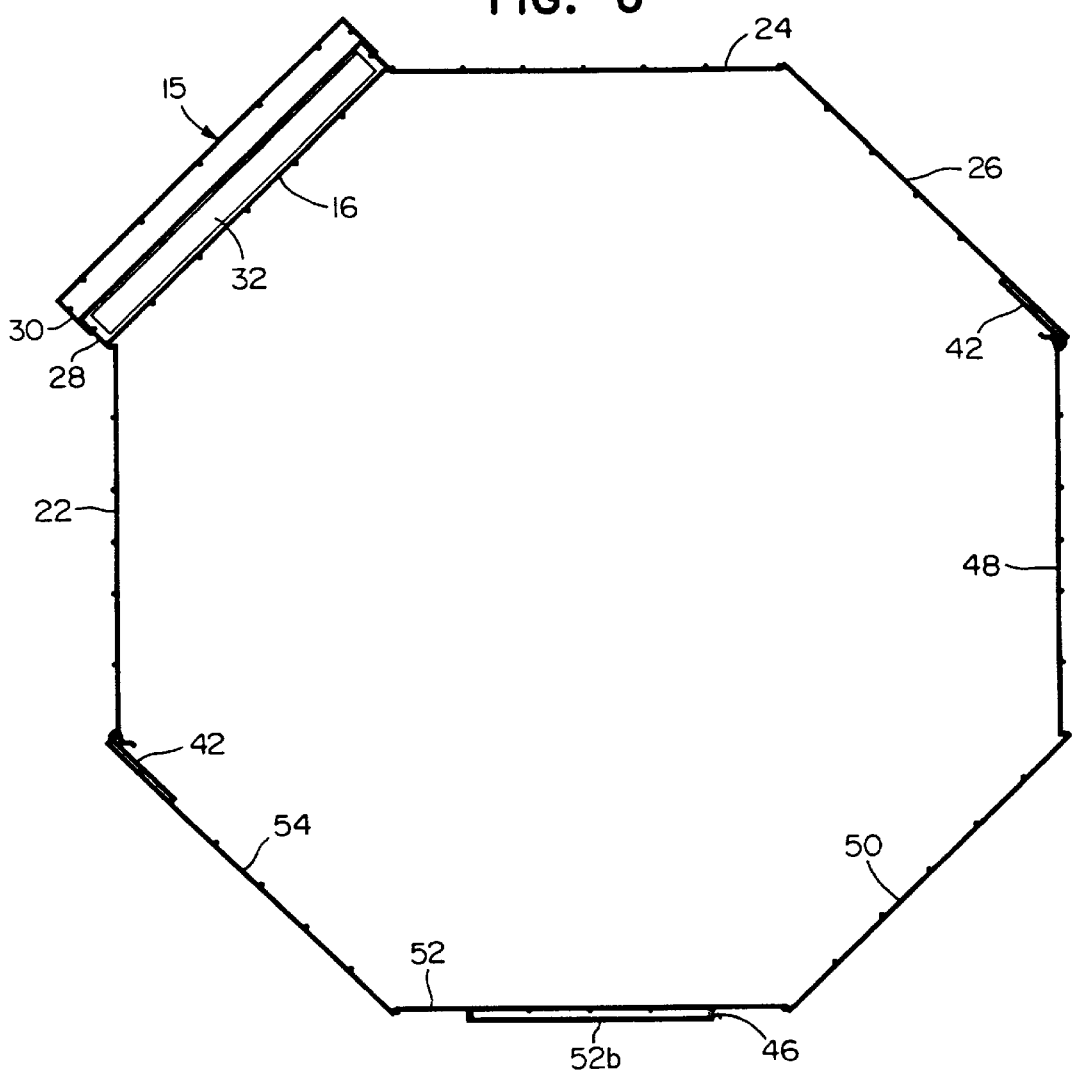
FIG. 6 is a plan view of the completed exercise pen.
Figure 7:
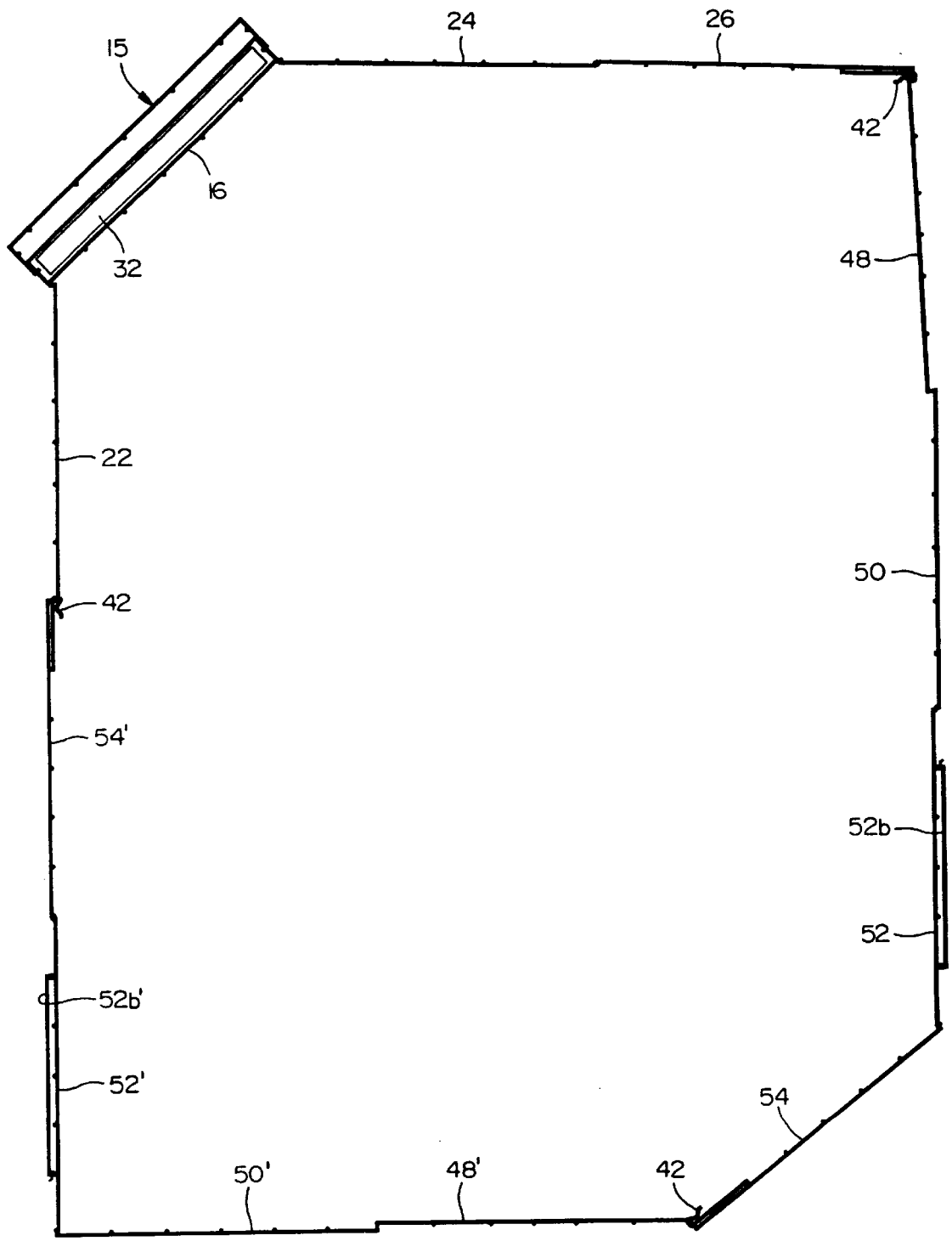
FIG. 7 is a plan view of an enlarged exercise pen made by adding on a further additional wall panel assembly.

The drawings show a collapsible structure 10 (FIG. 1) which can be erected to form a dog home as illustrated in FIGS. 3–3E, which can be converted from the dog home into an exercise pen for the dog as shown in FIGS. 6–7, and which can be folded and collapsed into a flat compact package as shown in FIG. 1. The collapsible structure comprises two basic modules, namely a dog home forming module 12 and an additional pen-forming wall module 14, both of which modules are made up of wire mesh panels or grids.

The home forming module 12, (See particularly FIGS. 1–3) comprises a rectangular base 15 with a top wall 16, end walls 18, 20 hinged to opposite ends of the base, side walls 22, 24 hinged to opposite sides of the base and a roof 26 hinged at one side to the top edge of side wall 24. The end walls 18, 20 can fold down onto the top wall 16 of the base one over another, followed by side walls 22 and 24 and roof 26, which can fold down onto side wall 24. Thus module 12 can be collapsed into the compact substantially flat package shown in FIG. 1.

The base 15 is formed by upper and lower shallow rectangular trays 28, 30 both made of wire mesh and which may be secured together by crimped cylinders 31 (see FIGS. 3A and 3D) engaged around adjacent rods of the respective trays, or by other suitable attachment means. Top wall 16 is similarly attached to tray 28. Tray 28 forms a receptacle for a slide-in animal droppings pan 32 and tray 30 forms a receptacle for folded wall forming module 14. A bar 36 at one end of tray 30 (see FIG. 3A) forms a stop for module 14 and bars 38 at the opposite end of tray 28 form a stop for pan 32. A pivotal wire rod clip 40 may be provided at the other end of tray 28 to form a releasable catch holding pan 32 in place. Clip 40 is similar to clip 26 which is disclosed in copending application Ser. No. 08/459,497 field Jun. 2, 1995 and commonly assigned herewith, the contents of which are expressly incorporated herein by reference.

End walls 18 and 20 are pivotally connected to opposite ends of top wall 16 by further crimped cylinders 31. At its sides, tray 28 extends somewhat above wall 16, and wall 24 is pivotally attached at one side of tray 28 by additional crimped cylinders 31 while wall 22 is similarly attached to the other side of tray 28 at a slightly higher level so that the side walls, end walls and roof can be folded down onto the base in a stacked arrangement as shown in FIG. 1. Roof 26 is pivotally connected to side wall 24 by further crimped cylinders 31. (In the pivotal connections between the respective walls, it is understood that in each case, the cylinders 31 are crimped around adjacent end rods of the grids forming the respective walls as, for example, the end rods 24a, 26a shown in FIG. 3E by way of example.)

Figure 8:
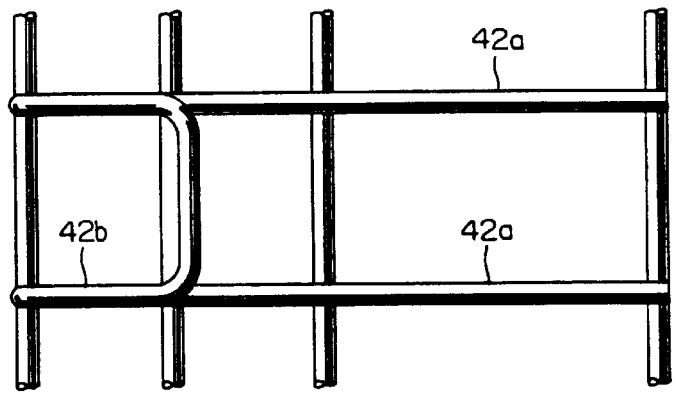
FIGS. 8 and 9 are enlarged plan and side views respectively of hooks which are provided on selected walls of the structure for clipping adjacent walls together when erecting the structure.
Figure 9:
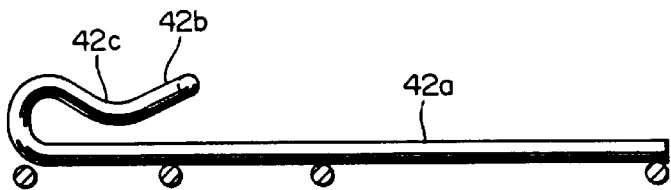

The roof 26 is provided along its free edges with hooks 42 for releasably clipping the roof to side wall 22 and to end walls 18, 20. The side walls 22 and 24 have like hooks 42 at their opposite ends for releasably clipping to the end walls 18, 20. As shown in FIGS. 8 and 9, each hook 42 is formed from a wire rod bent in a yoke-like shape with elongated legs 42a welded to a respective one of the walls 18–24 or roof 26, and a resilient saddle-shaped top hook portion 42b which is depressed at 42c to provide a resilient obstruction for an end rod of one of the walls of the structure when it is fitted into the hook. In each case, the hooks are welded in place so that the closed end of the hooks project slightly from the end of the respective wall on which they are attached. The arrangement is such, in each case, that as the structure is unfolded and opened out, the end rods of the respective walls can be push fitted into the hook of an adjacent wall to connect the walls together into a rigid elevated structure. FIG. 3E shows, for example, how end rod 18a of wall 18 fits into hook 42 on the roof 26 and how end rod 18b fits into hook 42 on the side wall 24. As seen in FIG. 3, the roof 26 has three hooks 42 along one side to connect with side wall 16 and two hooks 42 at each end to connect with end walls 18 and 20. The side walls 18 and 20 have two hooks 42 at each end to connect with the end walls 18 and 20. The remaining figures show a smaller model in which the number of roof hooks is reduced by one along each side of the structure.

End wall 18 has a pivotal lift-up animal access door and latch structure 44 for the dog home of like form to the door structure 28 described in the above-noted copending patent application and the details of which will not therefore be described herein. Reference is made to the copending application for such detail. When erected, the dog home is used in known manner and it will be understood that it can again be collapsed and folded, when required, by reversing the steps described above.

When the structure is collapsed into the package shown in FIG. 1, end walls 18, 20 are folded down onto base wall 16 with wall 18 lying over wall 20. Side wall 22 at its upper end is hooked to roof 26 by the hooks 42 along the side edge of the roof but all of the other hooks 42 are disconnected. This allows the side walls and roof to be folded down as a hinged unit onto base wall 16 over the end walls 18, 20 with side wall 24 lying over end wall 18, roof 26 lying over side wall 24 and side wall 22 at the top.

Figure 2:
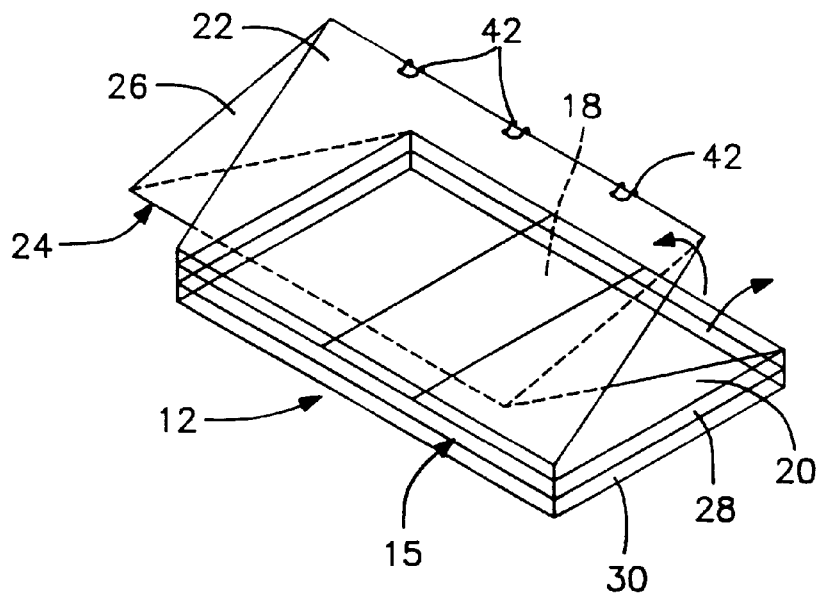
FIG. 2 is a diagrammatic perspective view of the structure showing a first stage of unfolding same to erect a dog home.
Figure 2A:
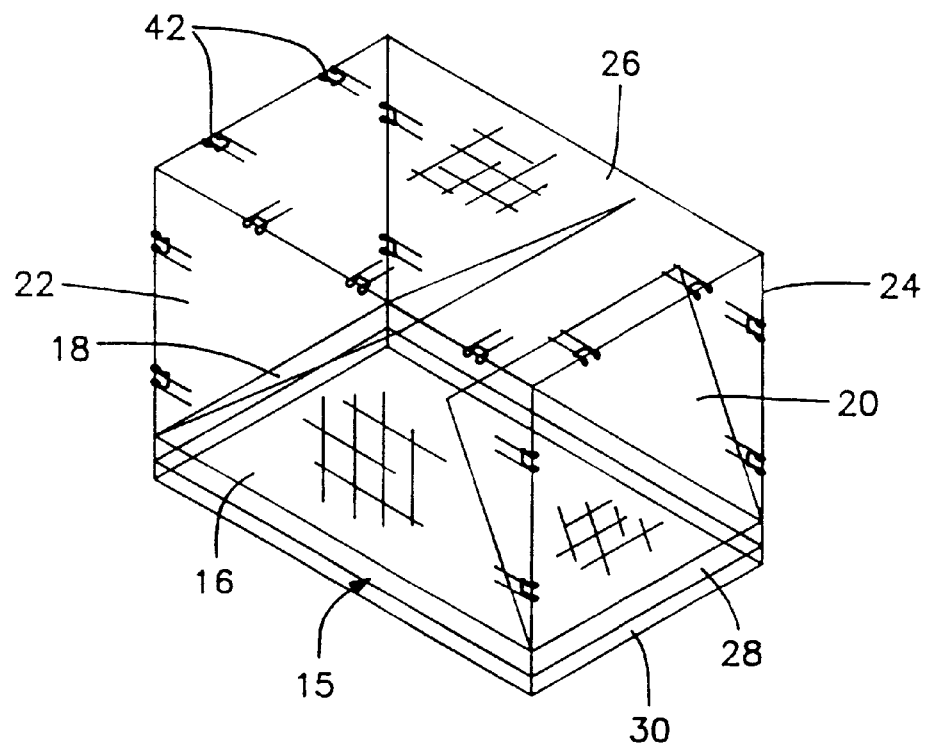
FIG. 2A is a diagrammatic perspective view of the structure showing a second stage of unfolding same to erect a dog home.

To elevate and erect the structure into a dog home, wall 22 and roof 26 are lifted by their hooked-together edges, see FIG. 2 and the side walls and roof are unfolded, opened out and elevated into an open-ended box as seen in FIG. 2A. Then, the end walls 18, 20 are raised from the base and their edges are engaged in the hooks 42 provided at the ends of the side walls and roof. This forms the structure into a rigid dog home as shown in FIG. 3. To collapse the dog home, the procedure is reversed, the end walls first being unhooked and folded down onto the base and the hooked-together side walls and roof being mutually folded and collapsed back through the FIG. 2 configuration down onto the base over the end walls. In these operations, the roof remains hooked to side wall 22 and the hooks 42 act as hinges during the unfolding and folding operations.

According to another feature of the invention, when the dog home is erected as shown in FIG. 3, there is sufficient flexibility in the structure to allow all of the roof hooks 42 to be released, by pressing in the top edges of the side walls and end walls while the wall hooks 42 remain engaged, so that the roof 26 can be hinged open in the manner of a box lid as shown in the dotted line position. The roof can be hooked again to the side walls and end walls in similar manner.

Figure 4:
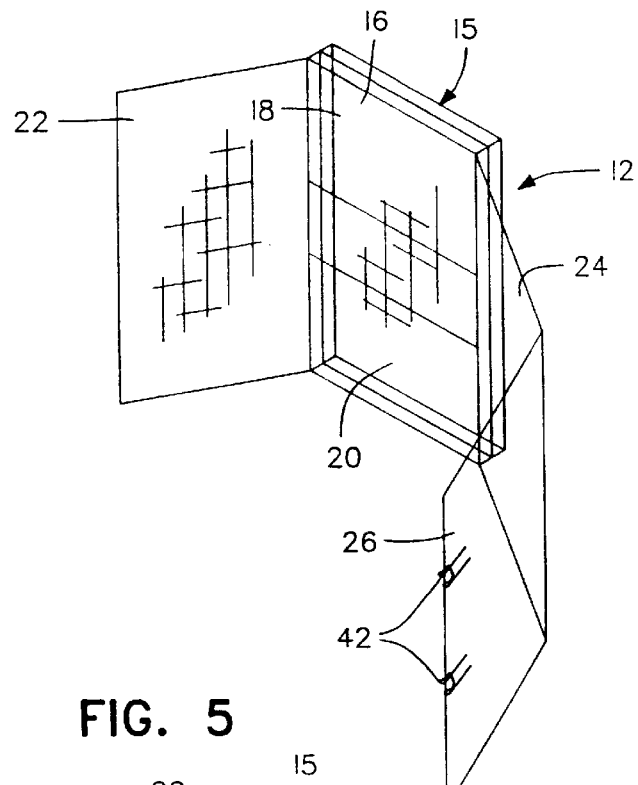
FIG. 4 is a diagrammatic perspective view of the structure showing a first stage in converting the dog home into an exercise pen.
Figure 5:
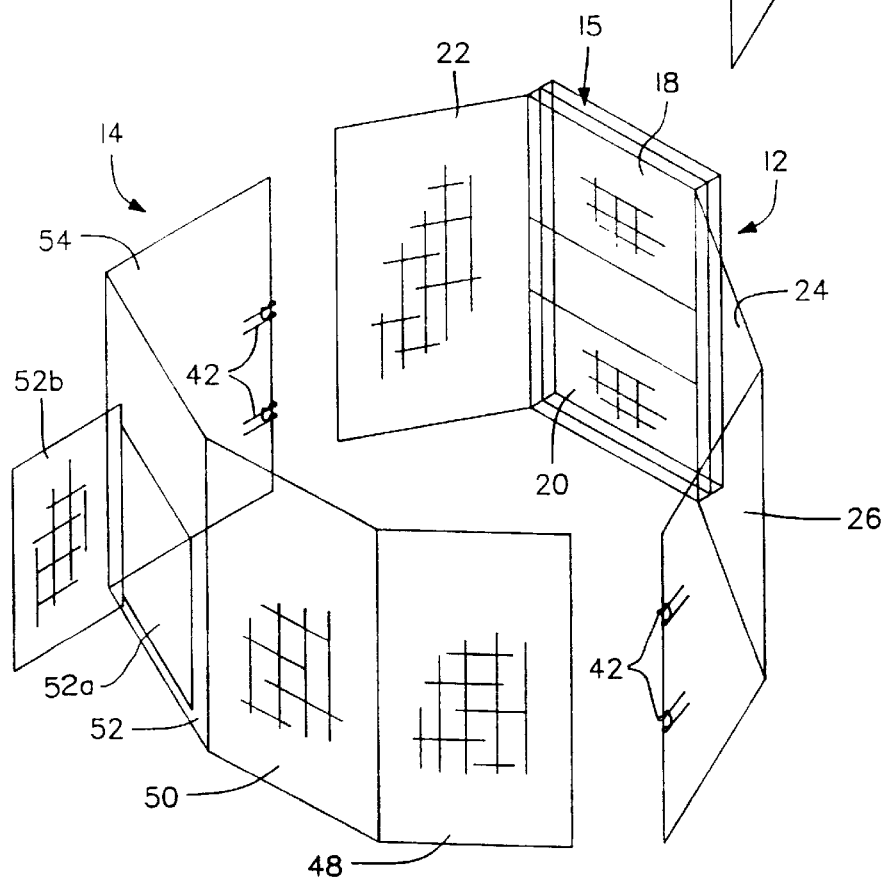
FIG. 5 is a diagrammatic perspective view of the structure showing a second stage in converting the dog home into an exercise pen by adding on an additional wall module assembly.

The dog home shown in FIG. 3 can be formed into an exercise pen in the manner illustrated in FIGS. 4 to 6 by using the additional wall-forming module 14. As shown in FIG. 4, the home-forming module 12 is set on one end, and the end walls 18 and 20 are folded in against the base 15 (or are kept folded against the base if starting from FIG. 1). A pivotal S-type hook 46 (FIGS. 3A, 3B) may be provided on a rod of one end wall to clip an adjacent rod of the other end wall to retain the end walls in place against the base. For this operation, the roof 26 is unhooked from side wall 22, side wall 22 is folded out to the position shown in FIG. 4, as are the side wall 24 and roof 26.

The additional wall-forming module 14, in the illustrated embodiment, is formed by four pivotally interconnected walls 48, 50, 52, 54 each formed by a metal grid of the same dimensions as the side walls 22, 24 and being pivotally interconnected along their longer edges by additional crimped cylinders 31. Walls 48–54 can fold against one another as shown in FIG. 1 to fit into tray 30 and can be removed and opened out to the position shown in FIGS. 5 and 6 to be attached to the home-forming module.

Wall 54 has hooks 42 along one edge to fit with end rod 22a of wall 22 (FIG. 7c) and the end rod of wall 48 fits into the hooks 42 on the adjacent edge of wall 26 to form the structure into an enclosed exercise pen as shown in FIG. 6. Wall 52 has a cut-out 52a (See FIG. 5) for a pivotal access door 52b secured by crimped cylinders 31 and provided with releasable S-type clips 46 for opening and closing the door. It is evident that the exercise pen can be readily dismantled and folded away into the package shown in FIG. 1. Additional S-type hooks may be provided on the roof 26 or wall 24 to clip onto wall 22 in the folded condition of the structure to retain the walls in place.

It is evident that the exercise pen can be readily reconverted into the dog home, or knocked down and refolded into the package shown in FIG. 1.

If a larger exercise pen is required a second wall module like wall module 14 and comprising walls 48', 50', 52', and 54' can be connected between wall 54 and wall 22 as shown in FIG. 7.

While only preferred embodiments of the invention have been described herein in detail, the invention is not limited thereby and modifications can be made within the scope of the attached claims.

What is claimed:

1. A convertible structure which can be erected selectively as a pet home and an exercise pen for a pet comprising a home-forming module and a pen-forming module, the home-forming module comprising home-forming elements including a base, first and second side walls, first and second end walls and a roof, a pet access door in one of the walls, hinge connections between the side walls and the base and between the side walls and the roof, and releasable attachments between the side walls and the end walls for erecting the home-forming module as a pet home, the pen-forming module comprising pen-forming elements including additional wall panels, hinge connections between the additional wall panels, and further releasable attachments for connecting the additional wall panels to selective ones of the home-forming elements to form a peripherally enclosed exercise pen.

2. A structure as claimed in claim 1, further including a second pet access door in one of the additional wall panels.

3. A structure as claimed in claim 1, including additional hinge connections between the end walls and the base for folding the end walls onto the base one over another.

4. A structure as claimed in claim 3, wherein the hinge connections between the side walls and the base and the side walls and the roof have a configuration for folding the side walls and the roof down to the base over the end walls with the roof located between the side walls whereby the home-forming module can be folded into a compact package.

5. A structure as claimed in claim 1, wherein the base comprises a panel member with upstanding sides defining a tray, the structure further including a pan slidably receivable in the tray.

6. A structure as claimed in claim 1, wherein the base comprises a panel member with upstanding sides defining a tray, the pen-forming module being slidably received in the tray.

7. A structure as claimed in claim 6, wherein the pen-forming module comprises plural wall panels each having dimensions substantially corresponding to the base whereby the additional wall panels may be folded about their respective hinge connections substantially flat one against another to fit in the tray.

8. A structure as claimed in claim 1, further including a pan, the base defining a storage area slidably receiving the pan and the pen-forming module.

9. A structure as claimed in claim 1, wherein the side walls, end walls, base, roof and additional wall panels comprise respective metal grids formed of mutually perpendicular metal rods.

10. A structure as claimed in claim 9, wherein the releasable attachments comprise respective hooks located at selected edges of the respective grids, each hook on one of the grids adapted to receive therein an end rod of an adjacent grid to retain the home-forming module in an erected position.

* * * * *